(No Model.)
W. B. CLEVELAND.
METHOD OF TRANSFERRING BATTERIES.
No. 425,493. Patented Apr. 15, 1890.
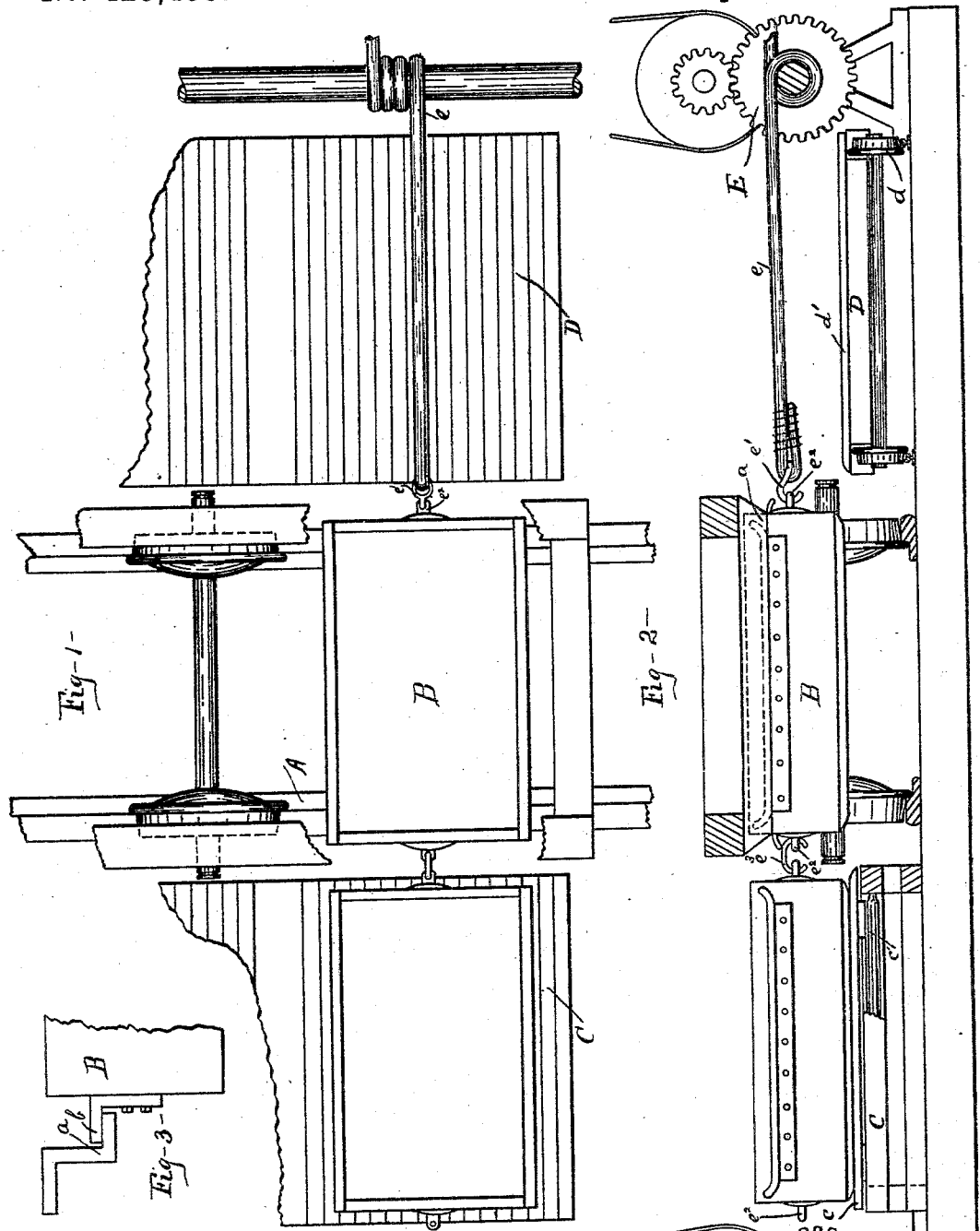
Witnesses
C. J. Cross
E. E. Pate
Inventor
Wm. B. Cleveland
by his attorneys
Hall & Fay

UNITED STATES PATENT OFFICE.

WILLIAM B. CLEVELAND, OF CLEVELAND, OHIO.

METHOD OF TRANSFERRING BATTERIES.

SPECIFICATION forming part of Letters Patent No. 425,493, dated April 15, 1890.

Application filed February 1, 1890. Serial No. 338,876. (No model.)

*To all whom it may concern:*

Be it known that I, WILLIAM B. CLEVELAND, a citizen of the United States, and a resident of Cleveland, county of Cuyahoga, and State of Ohio, have invented certain new and useful Improvements in Methods of Transferring Batteries, of which the following is a specification, the principle of the invention being herein explained and the best mode in which I have contemplated applying that principle, so as to distinguish it from other inventions.

My invention relates to methods for transferring secondary batteries for vehicles.

Heretofore a great objection to the use of secondary batteries for operating electric motors for street-railroad and other analogous purposes has been the delay incident to removing the exhausted batteries from the car and inserting the newly-charged batteries. This objection I aim to overcome by my improved method, which consists, essentially, of the removal of the exhausted battery simultaneously with the insertion of the newly-charged battery.

Referring to the drawings, Figure 1 is a plan view showing a portion of a car-truck carrying an exhausted battery, an empty transfer-truck, and a transfer truck or table carrying a fresh battery, together with battery-moving mechanism. Fig. 2 is an end view of the several figures shown in Fig. 1, and also of the winch or windlass gearing. Fig. 3 is a detailed view of battery-supporting ways.

A is a car-truck provided at either end outside of the wheels with the transverse ways $a$, as shown in Fig. 3, on which ways is supported battery B by means of ears $b$. A battery transfer-table C is provided with the top or floor $c$, that has longitudinal movement on the rollers $c'$, and by means of this the fresh battery on said table may be moved to bring it into line with the exhausted battery on the car.

A truck D, provided with the usual wheels $d$ and floor $d'$, may be used interchangeably with the table C. Steam winch or windlass mechanism E may be located at any convenient position, as on opposite sides of the place where it is desired to transfer the batteries. Each of said winches is provided with rope $e$, having secured to its extremity hook $e'$, adapted to hook into eyes $e^2$, secured on opposite extremities of the batteries. The exhausted and fresh battery may be coupled together by any suitable means, as link $e^3$.

The exhausted batteries may be recharged at any convenient place, and if that place should be in proximity to a car-truck, as shown in the drawings, the battery when charged may be placed on a stationary transfer-table, as C, and the truck carrying the exhausted or partially-exhausted battery moved into line with the table. Any little variation in the alignment of the fresh battery and exhausted battery may be corrected by moving the top $c$ on the rollers $c'$. The fresh and exhausted batteries are then coupled together by means of link $e^3$. On the opposite side of the car is seen a truck D, that may be moved along the track on which it rests. This truck is also moved in line with the battery that is to be removed. The rope $e$ of the winch is then connected to the exhausted battery and the winch connected to its actuating power, which may be of any suitable description. As the winch is operated, it draws the exhausted battery from its position beneath the car and simultaneously moves the newly-charged battery into its place. The battery may then be quickly connected with the motive power of the car. Indeed this may be done automatically. Thus no time is lost, as the entire transfer, according to my method, may be effected as expeditiously as a transfer of horses onto horse-cars.

It is of course to be understood that both the transfer table and truck may be of sufficient length to carry two batteries at the same relative distance as they occupy when on the car, and the same may be connected up with the two car-batteries and with the winch, so that both exhausted batteries may be removed simultaneously with the insertion of the fresh batteries.

The foregoing description and accompanying drawings set forth in detail one mode of carrying out my method. Change may be made therein provided the principles of operation respectively recited in the following claims are retained and employed.

I therefore particularly point out and distinctly claim as my invention—

1. A step in a method of transferring secondary vehicle-batteries, consisting in simultaneously removing the exhausted battery from the vehicle and inserting the freshly-charged battery in position on the vehicle, substantially as set forth.

2. Steps in a method of transferring secondary batteries for vehicles, consisting, first, in connecting an exhausted battery with a charged battery; second, simultaneously removing the exhausted battery and inserting the charged battery, substantially as set forth.

3. Steps in a method of transferring secondary batteries for vehicles, consisting, first, in connecting an exhausted or partially-exhausted battery with a charged battery, and also with some actuating power; second, simultaneously withdrawing the exhausted battery and inserting the charged battery, substantially as set forth.

4. Steps in a method of transferring secondary vehicle-batteries, consisting, first, in bringing the exhausted battery and fresh battery proximately in line with each other; second, connecting said two batteries together; third, simultaneously removing the exhausted battery and inserting the fresh battery, substantially as set forth.

In testimony that I claim the foregoing to be my invention I have hereunto set my hand this 29th day of January, A. D. 1890.

WM. B. CLEVELAND.

Witnesses:
J. B. FAY,
E. E. PATE.